United States Patent
Maruyama et al.

(10) Patent No.: US 6,246,740 B1
(45) Date of Patent: *Jun. 12, 2001

(54) SIC-COMPOSITE MATERIAL SLEEVE AND PROCESS FOR PRODUCING THE SAME

(75) Inventors: Tadashi Maruyama, Funabashi; Shoji Onose, Mito; Shiro Mitsuno, Yokohama, all of (JP)

(73) Assignees: Japan Nuclear Cycle Development Institute, Naka-gun; Nippon Carbon Co., Ltd., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,194

(22) Filed: Oct. 14, 1998

(30) Foreign Application Priority Data

Oct. 14, 1997 (JP) .................................................. 9-280927

(51) Int. Cl.[7] .............................. G21C 7/10; A47G 19/22; B32B 9/00
(52) U.S. Cl. .......................... 376/327; 376/333; 428/34.5; 428/698
(58) Field of Search ...................................... 376/327, 333; 428/698, 699, 325, 361, 367, 312.2, 312.6, 318.6, 307.3, 319.1, 446, 34.4, 35.5

(56) References Cited

U.S. PATENT DOCUMENTS

| | | | |
|---|---|---|---|
| 5,015,540 | * 5/1991 | Borom et al. | 428/698 |
| 5,031,201 | * 7/1991 | Gaillard et al. | 378/144 |
| 5,211,999 | * 5/1993 | Okada | 428/34.5 |
| 5,336,350 | * 8/1994 | Singh | 156/155 |
| 5,354,398 | * 10/1994 | Kawai | 156/89 |
| 5,439,627 | * 8/1995 | De Jager | 264/129 |
| 5,946,367 | * 8/1999 | Maruyama et al. | 176/327 |

FOREIGN PATENT DOCUMENTS

| | | |
|---|---|---|
| 0029797 | * 1/1989 | (JP) . |
| 405172978 | * 7/1993 | (JP) . |
| 6-31769 | 4/1994 | (JP) . |
| 406186373 | * 7/1994 | (JP) . |

* cited by examiner

Primary Examiner—Michael J. Carone
Assistant Examiner—K. Kevin Mun
(74) Attorney, Agent, or Firm—Pillsbury Winthrop LLP

(57) ABSTRACT

A cylindrical thin-wall sleeve including an SiC fiber-reinforced SiC composite material (SiC/SiC), which has a porosity of 40% or less and a wall thickness of 5 mm or less.

4 Claims, 3 Drawing Sheets

SIC-COMPOSITE MATERIAL SLEEVE AND PROCESS FOR PRODUCING THE SAME

BACKGROUND OF THE INVENTION

1. Field of the Invention

The present invention relates to a cylindrical sleeve comprising an SiC fiber-reinforced SiC composite material, which is capable of exhibiting excellent durability even under a severe condition such that it is irradiated with radioactive rays or radiation, etc. The composite material sleeve according to the present invention can suitably be used, particularly, as a component (or element) to be disposed in a nuclear reactor, a component constituting a control rod for controlling a nuclear reactor, a high-heat flux component for constituting a nuclear fusion reactor, a component for constituting a high-temperature heat exchanger, etc.

2. Related Background Art

A ceramic material has been well known as a material which is excellent in heat resistance. However, it is a relatively recent event that such a ceramic material has further overcome its disadvantage of "brittleness (or fragility)" so that it may retain a high strength even under a high-temperature condition. In addition, because of the "hard and brittle" characteristics of the ceramic material, it has required a special measure or device to use a ceramic material having a desired heat resistance and high strength as a structural material, i.e., to precisely process or form the ceramic material into a desired shape.

For example, with respect to a "sleeve" which is a hollow cylindrical member, when a monolithic ceramic material is used, the ceramic material is liable to cause brittle fracture during the processing, forming or machining thereof. Accordingly, it is difficult to prepare a long sleeve (e.g., one having a length of about 1 m) with a wall thickness of 0.2 to 0.4 mm.

When a carbon fiber-reinforced carbon composite material is used as the material for constituting a sleeve, it is possible to prepare the above-mentioned long sleeve. However, the carbon fiber-reinforced carbon composite material has a problem such that it is liable to cause a carburizing reaction with a cladding (or covering tube) comprising stainless steel (i.e., diffusion and permeation of carbon into the surface layer of the stainless steel).

When a heat-resistant steel is used as the material constituting a sleeve, it is also possible to prepare a long sleeve. However, the heat-resistant steel has a problem such that it is liable to cause a carburizing reaction with a boron carbide ($B_4C$) pellet as a neutron absorber (or neutron absorbing material).

When an alumina fiber-reinforced CMC (ceramic matrix composite material) is used as a sleeve material, such a CMC material has a problem such that it is liable to cause volume expansion or swelling when irradiated with neutrons.

Heretofore, as a control rod for controlling a nuclear reactor such as fast breeder reactor, one comprising a stainless steel cladding and a $B_4C$ pellet which has been inserted into the cladding.

When the control rod disposed in a nuclear reactor is irradiated with neutrons, the temperature of the control rod becomes higher, and the stainless steel constituting the cladding can be carburized by $B_4C$ so that it becomes brittle, whereby the cladding can be broken. In addition, as the $B_4C$ absorbs neutrons, it generates helium and is expanded, and the $B_4C$ pellet is broken due to a thermal stress caused by the heat generation and the resultant fragments are moved so that they fill the gap between the $B_4C$ and the stainless steel cladding. When the $B_4C$ pellet is continuously irradiated with neutrons in such a state, the resultant stress may act between the thus expanded $B_4C$ and the stainless steel tube, whereby the stainless steel cladding can be damaged in some cases.

In consideration of these circumstances, for the purpose of preventing the fragments of boron carbide $B_4C$ from moving in the cladding, there has been proposed a structure wherein a thin-wall pipe (usually, referred to as a "shroud") comprising austenite stainless steel, ferrite steel-stainless steel, etc., is disposed in the above-mentioned stainless steel cladding so that the shroud covers the entire length of the neutron absorber pellet (see, Japanese Patent Publication (KOKOKU) No. Hei 6-31769 (i.e., 31769/1994)).

However, when the above-mentioned control rod equipped with the shroud is used for a long period of time, the shroud comprising the stainless steel has a problem such that it is reacted with the boron carbide pellet and loses its ductility due to the carburization thereof, etc., thereby to lower its function or performance as a shroud tube.

SUMMARY OF THE INVENTION

An object of the present invention is to provide a sleeve which is excellent in heat resistance, corrosion resistance, high strength, and precision in formability (or processability), even under a severe condition such that the sleeve is exposed to radiation.

Another object of the present invention is to provide a sleeve which can exhibit an excellent performance or function as a shroud tube to be used for a nuclear control rod for controlling a nuclear reactor.

A further object of the present invention is to provide a sleeve having an excellent compatibility with boron carbide as a neutron-absorbing material.

As a result of earnest study, the present inventors have found that a thin-wall sleeve exhibiting an excellent durability even under a severe condition can be produced by using an SiC fiber-reinforced SiC composite material, which has heretofore been considered as a material which is difficult to be formed into a thin-wall sleeve.

The SiC fiber-reinforced SiC composite material sleeve according to the present invention is based on the above discovery, and comprises an SiC fiber-reinforced SiC composite material (SiC/SiC), which has a porosity of 40% or less and a wall thickness of 5 mm or less.

The present invention also provides a process for producing a cylindrical SiC composite material sleeve, wherein an SiC sleeve having a porosity of 40% or less and a wall thickness of 5 mm or less is formed by repeating a step of impregnating three or less laminated layers of a circularly knitted SiC continuous fiber with an organic silicon compound and then calcining the thus impregnated SiC continuous fiber so as to densify the circularly knitted SiC continuous fiber.

As described above, when the SiC fiber-reinforced SiC composite material is formed into a thin-wall sleeve having a specific porosity as mentioned above, there is provided a sleeve having a particularly excellent characteristic as a structural component (or element) or structural member, which is usable in an environment under which heat resistance, corrosion resistance, high strength, and/or precision in formability are required.

Particularly, when the sleeve comprising an SiC fiber-reinforced SiC-base composite material according to the present invention is inserted, as a shroud, between a stainless steel cladding and a $B_4C$ pellet (neutron absorber), there is provided a control rod which has an excellent characteristic such that the shroud is very little damaged by the irradiation thereof with neutrons, it has a tolerance for mechanical damage (i.e., durability in a case where a part of the shroud is mechanically damaged), the movement or migration of the $B_4C$ in the stainless steel cladding can be prevented, and the stainless steel cladding is less liable to be damaged. When the sleeve according to the present invention is used as a shroud, unlike the case where a shroud comprising stainless steel is used, the carburization of the SiC fiber-reinforced SiC-base composite material constituting the sleeve according to the present invention is suppressed to a very low level.

In addition, since the sleeve according to the present invention can be formed into a thin-wall sleeve having a wall thickness of 0.5 mm or less, unlike a case where a thick-wall sleeve is used as a shroud, it is avoided that the amount of the $B_4C$ pellet to be inserted into the shroud is decreased so as to invite a reduction in the neutron-absorbing capacity of the control rod.

The following Tables 1 to 3 show comparisons between various kinds of processes for producing SiC/SiC, comparisons between various kinds of inorganic continuous fibers, and comparisons between various kinds of materials in a case where their usage as a shroud is taken into consideration. With respect to the data on which such comparisons are based, e.g., papers (R. H. Jones, D. Steiner, H. L. Heinisch et al., Journal of Nuclear Materials, 245 (1997) 87–107; F. W. Clinard, Jr., G. F. Hurley and R. W. Klaffky, Res Mechanica, 8 (1983), 207–234) may be referred to.

TABLE 1

Comparisons between Various Kinds of SiC/SiC Production processes in Consideration of Shroud

| PRODUCTION PROCESS | CVI *[1] | RB *[2] | PIP *[3] |
| --- | --- | --- | --- |
| INSTALLATION (DOMESTIC lm) | Δ | Δ | ○ |
| DIMENSION OF THIN WALL | Δ | Δ | ○ |
| TOLERANCE FOR MECHANICAL DAMAGE | ○ | ○ | ○ |
| OVERALL EVALUATION | Δ | Δ | ○ |

*[1] impregnation of chemical vapor deposition;
*[2] reaction baking and sintering method;
*[3] polymer impregnation pressing and baking method.

TABLE 2

Comparisons between Various Kinds of Inorganic Continuous Fibers in Consideration of Shroud

| KIND | $Al_2O_3$ ✕ | Si—C—O | Si—Ti—C—O | Si—N—C—O | SiC/C | SiC |
| --- | --- | --- | --- | --- | --- | --- |
| TRADE NAME | ALMAX | NICALON | TIRANO | TONEN | FP | HI-NICALON |
| WEAVING PROCESSABILITY | ○ | ○ | ○ | ○ | X | ○ |
| NEWTRON DAMAGE | Δ (SWELLING) | Δ | X (CONTAINING Ti) | Δ (CONTAINING N) | ○ | ○ |
| HEAT RESISTANCE (in He, 1300° C.) | ○ | X (OXYGEN) | X (OXYGEN) | X (NITROGEN) | ○ | ○ |
| OVERALL EVALUATION | Δ | Δ | X | X | X | ○ |

TABLE 3

Comparisons between Various Kinds of Materials in Consideration of Shroud

| REQUIRED QUALITY | MONOLITHIC CERAMICS | HEAT-RESISTANT STEEL | C/C *[1] | SiC/SiC *[2] |
| --- | --- | --- | --- | --- |
| DIMENSION OF THIN WALL ('0.3 mm) | X | ○ | ○ | ○ |
| REACTION WITH STAINLESS STEEL TUBE | ○ | ○ | X (CARBURIZATION) | ○ |
| REACTION WITH $B_4C$ PELLET | ○ | X (CARBURIZATION) | ○ | ○ |
| TOLERANCE FOR | X | ○ | ○ | ○ |

TABLE 3-continued

Comparisons between Various Kinds of Materials in Consideration of Shroud

| REQUIRED QUALITY | MONOLITHIC CERAMICS | HEAT-RESISTANT STEEL | C/C *1 | SiC/SiC *2 |
|---|---|---|---|---|
| MECHANICAL DAMAGE | (CATASTROPHIC) | | | |
| NEUTRON TRANSMISSIVITY | ○ | ○ | ○ | ○ |
| OVERALL EVALUATION *3 | X | Δ | Δ | ○ |

*1 C/C: carbon fiber-reinforced carbon composite material
*2 SiC/SiC: SiC fiber-reinforced SiC composite material
*3 Overall evaluation:

The symbol "X" represents a state wherein the corresponding material is marked with "X" twice or more.

The symbol "Δ" represents a state wherein the corresponding material is marked with "X" once.

The symbol "○" represents a state wherein the corresponding material is marked with no "X".

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
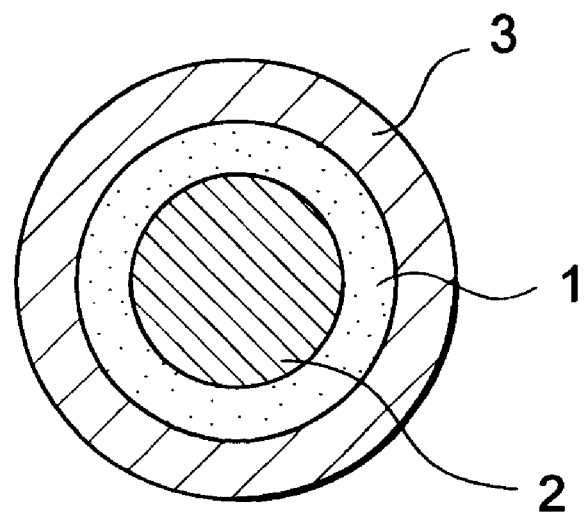
FIG. 1 is a schematic sectional view showing a multilayer state of a core, a sleeve and a releasing paper, when the sleeve is cut with a cutter after the weaving thereof.

1: sleeve, 2: core material, 3: releasing paper, 10: neutron absorber, 11: shroud, 12: gap, and 13: cladding.

DESCRIPTION OF THE PREFERRED EMBODIMENTS

Hereinbelow, the present invention will be described in detail with reference to the accompanying drawings, as desired. In the following description, "part(s)" and "%" representing amounts and ratios are based on weight unless otherwise noted specifically.
(Sleeve)

The sleeve according to the present invention comprises an SiC fiber-reinforced SiC-base composite material, and is a sleeve having a porosity of 40% or less and a wall thickness of 5 mm or less.
(Porosity)

In the sleeve according to the present invention, the porosity thereof is 40% or less. Such a porosity may preferably be 5% to 35% (more preferably, 5% to 15%).

In the present invention, the above-mentioned porosity "p" is defined in the following manner. p=(true (or absolute) specific gravity−bulk specific gravity)/(true specific gravity) The above-mentioned "bulk specific gravity" and "true specific gravity" may suitably be measured by the following method.
(Method of Measuring Bulk Specific Gravity)

The volume of a sample to be measured is calculated from its sizes or dimensions, and then the sample is weighed. The bulk specific gravity of the sample is determined from the thus measured data according to the following formula:

$$\text{bulk specific gravity} = \text{weight/volume}$$

(Method of Measuring True Specific Gravity)

The principle of the measurement of the true specific gravity is in accordance with the Archimedes method. As the corresponding testing methods according to the JIS (Japanese Industrial Standard), e.g., there is JIS R-7212, wherein butanol (butyl alcohol) is used as a liquid, and the true specific gravity of a sample is measured after it is pulverized into powder having a size of 149 μm (microns) or less.

More specifically, in such a case, the volume of a sample (after the pulverization) is measured by the above-mentioned Archimedes method using butanol as a liquid. Then the sample is weighed. The true specific gravity of the sample is determined from the thus measured data according to the following formula:

$$\text{true specific gravity} = \text{weight/volume}$$

(Wall Thickness)

The sleeve according to the present invention has a wall thickness of 5 mm or less. When the wall thickness exceeds 5 mm, the heat transmissivity of the sleeve is lowered, and a decrease in the inner volume of the sleeve (e.g., a decrease in the capacity of accommodating "another material" such as neutron absorber to be disposed in the sleeve) is invited.

As long as the mechanical strength required for the sleeve is satisfied, the wall thickness of the sleeve may preferably be as small as possible, in view of the prevention of non-uniform heat transfer or heat transmission, and in view of a reduction in the space occupied by the sleeve per se (i.e., provision of a sufficient space for "another material" such as neutron absorber). More specifically, the wall thickness of the sleeve may preferably be about 3 to 1 mm, more preferably about 1 to 0.5 mm (particularly preferably, about 0.3 to 0.2 mm).

(SiC Fiber)

The SiC (silicon carbide) fiber usable in the present invention is not particularly restricted, but it may preferably be an SiC fiber which is obtained by an electron-beam insolubilizing (infusibility-imparting) method (e.g., see Japanese Laid-Open Patent Application (KOKAI) No. Hei 4-194,028 (i.e., 194,028/1992)) in view of the purity of the SiC fiber.

The composition of the above-mentioned SiC fiber is not particularly restricted. In view of the heat resistance of the fiber, the SiC fiber may preferably be an SiC fiber containing, at least, Si, C and O. Further, it may more preferably be an SiC fiber having a composition in the following composition ranges:

Si:50% to 70% (more preferably 60% to 70%)
C:30% to 40% (more preferably 30% to 38%)
O:0.01% to 14% (more preferably 0.01% to 1%)

The surface of the above-mentioned SiC fiber may be coated (or covered with a coating) as desired. When such a coating is provided on the surface of the SiC fiber, the tolerance for the mechanical damage thereto can be enhanced. In view of easiness in the formation of a dense and uniform interface between the coating and the SiC fiber surface, e.g., it is preferred to use one kind or a combination of at least two kinds of coating selected from the group consisting of: CVD (chemical vapor deposition)-carbon coating, CVD-BN (boron nitride) coating, and CVD-SiC coating.

In view of the weaving property, the SiC fiber (before it is subjected to the composite formation with SiC) may preferably have a diameter of about 5 to 20 $\mu$m, more preferably about 8 to 15 $\mu$m.

(SiC/SiC Composite Material)

As long as a sleeve having a physical property defined in the present invention is provided, the process for producing the SiC/SiC composite material (fiber) constituting the sleeve is not particularly restricted. In view of the tolerance for the mechanical damage to the sleeve, it is preferred to use a CVD method (wherein chemical vapor deposition is effected at a high temperature in a raw material gas), a CVI method (impregnation of chemical vapor deposition, wherein permeation of a chemical vapor deposition gas is effected in a raw material gas at a high temperature), an RB method (reaction baking and sintering method), and a PIP method (polymer impregnation pressing and baking method). Among these, the PIP method is particularly preferably usable in view of easiness in the preparation of a thin-wall sleeve using an SiC/SiC composite material.

As desired, it is also possible to use two or more kinds of the above-mentioned CVD, CVI, RB, and PIP methods in combination.

(Process for Producing Sleeve)

The SiC composite material sleeve according to the present invention may be provided, e.g., by circularly knitting a continuous fiber comprising SiC, and then, forming a continuous fiber for constituting a sleeve into an SiC-composite state(SiC/SiC-composite formation), by use of the PIP method, etc.

(Weaving Method)

As long as a sleeve having a desired physical property according to the present invention is provided, the method of weaving the above-mentioned continuous fiber into the sleeve is not particularly restricted, but a known weaving method can be used. In view of uniformity in the wall thickness of the sleeve, it is preferred to use a "circular (or tubular) knitting method" may preferably be used, as the above-mentioned weaving method. With respect to the details of the "circular knitting method", e.g., "Kako Hen (Section of Processing)" of Sen'i Binran (Handbook to Fibers), edited by the Society of Fiber Science and Technology, Japan, p. 502 et seq., published on May 30, 1969 (Showa-44) by Maruzen Co., Ltd. may be referred to.

It is preferred to form a desired sleeve shape, e.g., by inserting a core material (e.g., a bar-shaped or rod-shaped body comprising a metal such as titanium and iron) into the above-mentioned circularly knitted continuous fiber, and as desired, then pulling both of the ends of the circularly knitted fiber product. In this case, prior to the insertion of the core material into the circularly knitted fiber product, a releasing agent, a releasing paper, etc. may be disposed in advance on the surface of the core material, as desired.

It is also possible to used the sleeve as provided above in the next step, as desired, after two or more of the thus provided sleeves are disposed or superposed on each other. In view of the wall thickness of the sleeve, the "number of layers" of the continuous fiber constituting the sleeve may preferably be 3 or less.

At this time, as desired, the second layer to be disposed or superposed on the first layer may be formed into a sleeve-like shape, similarly as that of the first layer. In this case, it is preferred that the continuous fiber for constituting the second layer is formed into a sleeve-like shape, and then both ends of thus formed sleeve-like continuous fiber product are slightly compressed (along the axial direction of the sleeve) so as to provide an outside diameter of the resultant product which is slightly greater than that of the "first layer", and thereafter the thus formed second layer is disposed on the first layer.

In the present invention, in view of easiness in the provision of a dense structure, e.g., it is preferred to use the following woven structure:

count (or thread count): 20 to 30 fibers/inch
weaving angle (axial direction): 30° to 60°
number of laminated layers: 1 to 2
outside diameter: 12.1 to 12.3 mm
porosity (before impregnation): 40% to 60%

The above-mentioned "weaving angle" refers to an angle (acute angle side) formed between the axial direction of the circular knitting and the direction of the continuous fiber constituting the circular knitted product.

The thus provided circular knitted product may be cut into a desired length as desired. At this time, this cutting operation can be carried out by known cutting means (such as diamond cutter). In view of the prevention of the "fraying out" of fibers at the time of the cutting operation, e.g., it is preferred that, as shown in the schematic sectional view of FIG. 1, an appropriate core material 2 (having an outside diameter equal to the inside diameter of a sleeve 1) is inserted into the sleeve 1, a releasing paper 3 (having a thickness of 200 $\mu$m) is wound around the outer periphery of the sleeve 1, and then the sleeve 1 is cut together with the releasing paper 3 and the core material 2. In view of the releasability, the thickness of the above-mentioned releasing paper 3 may preferably be about 100 to 300 $\mu$m.

(Impregnation and Calcination)

There are described preferred embodiments of the present invention in a case where the SiC fiber is formed into a composite product by using the above-mentioned PIP method.

First, a predetermined core material is inserted into a circular knitted product which has been obtained by weaving an SiC continuous fiber, and is to be impregnated with an organic silane compound. In view of the prevention of the occurrence of "wrinkle" and damage (such as fracture) in this impregnating and calcination step, the core material may preferably have a coefficient of thermal expansion of about 1 to $7 \times 10^{-6}$/°C. Specific examples of materials having such a coefficient of thermal expansion may include a titanium rod, a CFRP (carbon fiber-reinforced plastic) rod, etc.

In view of the prevention of the occurrence of wrinkle, the outside diameter of the core material may preferably be greater than the inside diameter of the sleeve so as to take account of the shrinkage at the time of the calcination. It is further preferred that the outside diameter of the core material is greater than the inside diameter of the sleeve by about 2% to 10%, based on the inside diameter of the sleeve.

The core material to be inserted into the sleeve may preferably be coated with a release agent or may preferably be wound with a releasing paper in advance. As the "releasing paper" to be used in such a case, it is preferred to use a "release tape" comprising a paper material and an adhesive disposed on the surface thereof to be attached to the core material. Such a release tape can suitably be used for the above-mentioned purpose, since it is easily carbonized by heating at the time of the calcination, whereby it can readily be removed.

(organic Silicon Compound)

The organic silicon compound usable in the PIP method in the present invention is not particularly restricted, as long as it can provide SiC by a synthetic process. In view of the formation of silicon carbide, it is preferred to use polycarbosilane —(R)Si—C—)n (wherein R is an alkyl group), polyvinylsilane $CH_3$—Si[$(CH_2$=CH) $(CH_3)$Si]n—Si—$CH_3$, polysilastyrene —[Si($C_6H_5$) $(CH_3)$—]$_{n1}$—[Si$(CH_3)_2]_{n2}$—, etc. Among these, it is particularly preferred to use polycarbosilane in view of the ratio (or amount) of the residual product at the time of the calcination.

In view of the impregnating property, the above-mentioned organic silicon compound may preferably have an average molecular weight of about 500 to 100,000 (more preferably about 500 to 3,000).

(Impregnation)

At the time of the impregnation, it is possible to use a solvent as desired. The solvent to be used for such a purpose is not particularly restricted, as long as it can dissolve the above-mentioned organic silicon compound. In view of the industrial adaptability, it is preferred to use an organic solvent such as xylene, hexane and toluene. In view of the permeability, the concentration of the solution to be used for the impregnation may preferably be about 50% to 100% (more preferably about 50% to 70%).

In order to efficiently carry out the impregnation with the above-mentioned organic silicon compound, a vacuum-pressurization impregnation technique may preferably be used. At this time, the degree of vacuum may preferably be about 0.1 to 20 mmHg, and the applied pressure (gauge pressure) at the time of the pressurization may preferably be about 5 to 10 kg/cm².

In view of the a reduction in the wall thickness and homogeneity in the wall thickness of the sleeve, it is also preferred to effect "taping pressurization" after the impregnation of the above-mentioned organic silicon compound. It is preferred to effect such a taping operation, by using a resin tape comprising polyethylene, etc., and winding the tape around the surface of the sleeve (after the impregnation), while pulling the tape by a force at a load of about 1 to 10 kgf. In this case, the load to the tape can be measured by use of a known means such as spring balance. In view of the strength, the above-mentioned tape used for the taping may preferably have a thickness of about 10 to 30 μm and a width of about 5 to 20 mm.

(Calcination)

It is preferred to effect the calcination in an atmosphere of an inactive gas (such as nitrogen and argon) at an ordinary (or atmospheric) pressure at a high temperature, so as to cause SiC to be produced from the organic silicon compound which has been disposed between threads of the SiC fiber by the impregnation therewith. The final heat-treating temperature may preferably be about 800 to 1,600° C. (more preferably about 1,3000 ° to 1,500° C.).

At the time of this calcination step, in view of the prevention of the warpage which may occur in the sleeve (caused by the warpage, etc., caused in the core material), e.g., it is preferred to support the outside of the sleeve by a "pressing-type mold". In view of easiness in the attachment of/detachment from the sleeve, the pressing-type mold has a split mold-like shape (wherein the cross section in a direction perpendicular to the axis is semicircular).

In order to effectively prevent the occurrence of the warpage in the calcination step, the material constituting the pressing-type mold may preferably have a coefficient of thermal expansion of about 1 to $7 \times 10^{-6}$/°C. Specific examples of the material having such a coefficient of thermal expansion may include graphite material, etc.

(Embodiment of Shroud)

Figure 2:
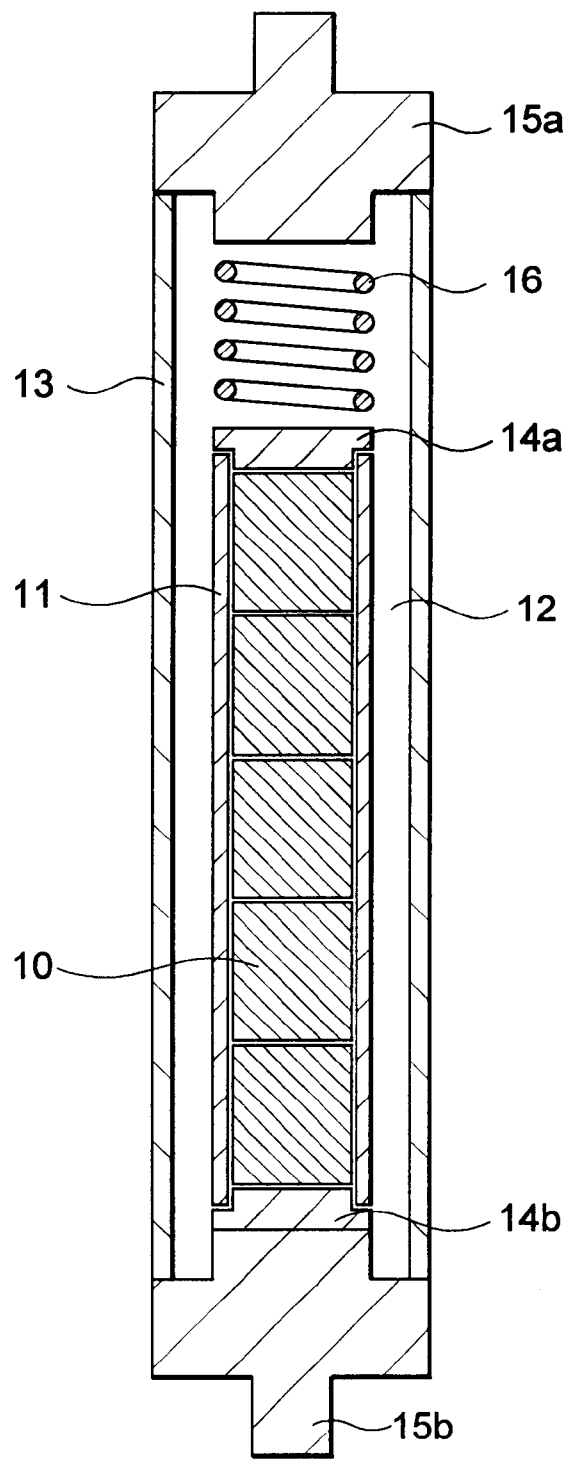
FIG. 2 is a schematic sectional view showing an embodiment where the sleeve according to the present invention is used as a shroud to be used for a control rod for controlling a nuclear reactor.
Figure 3:
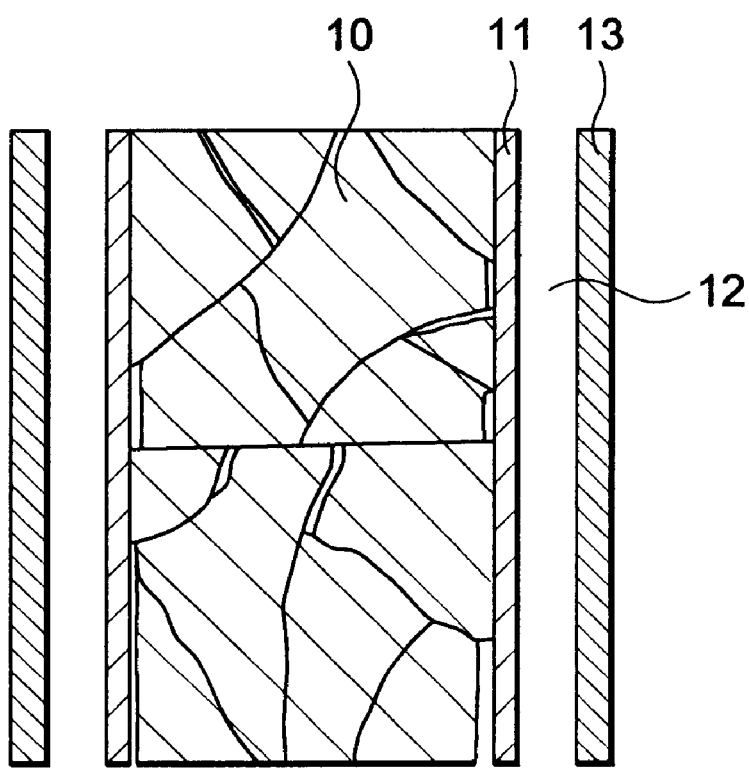
FIG. 3 is a partially enlarged view of FIG. 2. In the above FIGS. 1–3, the reference numerals have the following meanings.

The schematic sectional view of FIG. 2 shows an example of the embodiment wherein the sleeve according to the present invention is used as a shroud (thin-wall tube) for a control rod for controlling a nuclear reactor. FIG. 3 is an enlarged view of FIG. 2.

Referring to FIG. 2, a neutron absorber pellet 10 comprising $B_4C$, etc., is disposed in a hollow cylindrical shroud 11 which comprises the sleeve according to the present invention. Further, a hollow cylindrical cladding 13 (comprising stainless steel, etc.) is disposed outside the shroud 11 with a predetermined gap 12 from the shroud 11.

Both sides of the neutron absorber pellet 10 in the shroud 11 are held by pellet stoppers 14a and 14b, respectively. Further, the neutron absorber pellet 10 and the shroud 11 in the cladding 13 are held by end plugs 15a and 15b respectively disposed at both ends of the cladding 13. Between one end plug 15a and one pellet stopper 14a, there is disposed a pellet-pressing spring 16 for holding the shroud 11 in a suitable state.

Hereinbelow, the present invention will be described in more detail with reference to specific Examples.

EXAMPLES

Example 1

(Formation of Sleeve)

A continuous fiber having a diameter of 14 μm comprising SiC (mfd. by Nippon Carbon Co., Ltd.; trade name: Hi-Nicalon) was circularly knitted so as to provide a circularly knitted sleeve having an outside diameter of 12.0 mm, a thread count of 20 to 30 fibers/inch, a weaving angle (in the axial direction) of 30° to 60°, and a wall thickness of 0.2 mm.

Referring to FIG. 1, a core material 2 having an outside diameter of 12 mm was inserted into the circularly knitted sleeve 1 provided above, and thereafter a releasing paper 3 having a thickness of 200 μm was wound around the outer periphery of the sleeve for the purpose of preventing the fibers from fraying out, whereby the sleeve was held. The sleeve thus wound with the releasing paper 3 was cut by a diamond cutter into a predetermined length (1 m). The thus obtained sleeve had a porosity of 55%.

On the other hand, a titanium rod having an outside diameter of 11.4 mm and a length of 1,200 mm was wound with a paper-type releasing paper comprising an organic matter which was to be carbonized. The titanium rod wound with the releasing paper was inserted into the above-mentioned SiC fiber sleeve which had been cut in the above manner.

The sleeve was disposed in an air-tight vessel, the vessel was then evacuated to provide a vacuum state (1 mmHg) and retained in this state for 10 minutes. Thereafter, 180 ml of a 50% solution (solvent: xylene) of an organic silicon compound of polycarbosilane $(Si(CH_3)CH_2\text{---})n$ (mfd. by Nippon Carbon Co., Ltd.; trade name: NIPUSI) having an average molecular weight of 2,000, was poured into the above vessel. Further, the vessel was pressurized (10 kg/cm$^2$) and retained for 180 minutes so that the interior of the sleeve was impregnated with the resin solution.

Thereafter, the outer periphery of the sleeve was pressed by taping with a polyethylene tape (having a thickness of 15 μm and a width of 15 mm) at a load of 2 kgf.

Around the outer periphery of thus impregnated sleeve after the taping, there was disposed a graphite mold in a cylindrical shape of "split-type mold" (separable into two pieces along its axial direction) having an inside diameter which was equal to the outside diameter of the sleeve. While such a load (about 2 kgf) was applied thereto so as to retain the above-mentioned shape, the sleeve was sintered with an inactive gas (argon gas) at 1,350° C. for 60 minutes, thereby to prepare a thin-wall SiC fiber-reinforced SiC composite material sleeve (PIP method).

After the sintering, the above-mentioned Ti rod was removed from the sleeve, and the matter attached to the inside and outside of the sleeve was removed by using a sandpaper #100, while taking care so as not to damage the SiC fiber.

The end faces of the sleeve after the above-mentioned density-imparting treatment were cut so as to provide a finished sleeve having a predetermined length (100 cm).

The thus provided sleeve had a porosity of 30%, and no transmission of light was observed when observed with naked eyes. When the sleeve was placed on a flat surface, and the maximum gap between the flat surface and the sleeve was measured by use of a "clearance gauge", it was found that the warpage was about 0.1 mm with respect to a sleeve length of 1 m.

Example 2

(Preparation of Sleeve by CVI Method and RB Method)

Thin-wall sleeves comprising SiC fiber-reinforced SiC composite material (SiC/SiC) were provided in the same manner as Example 1 except that a CVI method (chemical vapor deposition gas infiltrating method) or RB method (reaction baking method) were respectively used under the following conditions, instead of the PIP method (polymer impregnation pressing method) used in Example 1.

<Conditions of CVI Method>

In an atmosphere of silicon tetrachloride $SiCl_4$, methane $CH_4$, and a hydrogen gas carrier, gases were permeated and deposited into the sleeve base material at 10 torr at 1,300° C.

<Conditions of RB Method>

The base material SiC sleeve was impregnated with a slurry comprising carbon black, phenol resin, and β-SiC powder dispersed in water. The resultant product was dried, and thereafter the sleeve was further impregnated with molten silicon in a vacuum at a temperature of 1,450° C.

Example 3

(Evaluation of Mechanical Characteristic of Ceramic Matrix Composite (CMC))

There is no evaluation standard for mechanical property of a sleeve-shaped CMC. Therefore, flat sheets comprising various kinds of ceramic matrix composite materials (CMC) were prepared and subjected to a high-temperature tensile test and a room-temperature bending test (after exposure thereof to a high temperature), according to standards of "PEC-TS CMC 01: Room-Temperature and High-Temperature Tensile Strength-Distortion Behavior Testing Method for Long Fiber-Reinforced Ceramic-Base Matrix Composite" and "PEC-TS CMC 04: Room-Temperature and High-Temperature Bending Strength Testing Method for Long Fiber-Reinforced Ceramic-Base Matrix Composite". With respect to the details of these PEC-TS standards, e.g., papers (PEC-TS CMC 01, 09) may be referred to.

The following Tables 4 to 7 show thus obtained results of high-temperature tensile tests and high-temperature durability.

<TABLE 4>

High-Temperature Tensile Strength at Respective Temperatures in Air (interface: boron nitride; reinforced fiber: Hi-Nicalon; production process: PIP method)

| Temperature | Tensile strength |
|---|---|
| 20° C. | 350 Mpa |
| 400° C. | 350 MPa |
| 1,200° C. | 230 Mpa |
| 1,400° C. | 160 Mpa |

<TABLE 5>

High-Temperature Tensile Strength at Respective Temperatures in Air (interface: carbon; reinforced fiber: Nicalon; production process: PIP method)

<TABLE 6>
Room-Temperature Bending Strength After High-Temperature Exposure at 1,400° C. in Air
(interface: boron nitride; reinforced fiber: Hi-Nicalon; production process: PIP method)

| Temperature | Tensile strength |
| --- | --- |
| 20° C. | 110 Mpa |
| 400° C. | 110 MPa |
| 600° C. | 60 Mpa |
| 1,000° C. | 50 Mpa |

| Exposure time | Bending strength |
| --- | --- |
| 0 h | 400 MPa |
| 200 h | 400 MPa |
| 600 h | 400 Mpa |

<TABLE 7>
Room-Temperature Bending Strength After High-Temperature Exposure at 1,400° C. in Air
(interface: carbon; reinforced fiber: Nicalon; production process: PIP method)

| Exposure time | Bending strength |
| --- | --- |
| 0 h | 300 MPa |
| 200 h | 100 MPa |
| 600 h | 50 MPa |

As described hereinabove, the present invention provides a cylindrical thin-wall sleeve comprising an SiC fiber-reinforced SiC composite material (SiC/SiC), which has a porosity of 40% or less and a wall thickness of 5 mm or less.

The present invention also provides a process for producing a cylindrical SiC composite material sleeve, wherein an SiC sleeve having a porosity of 40% or less and a wall thickness of 5 mm or less is formed by repeating a step of impregnating three or less laminated layers of a circularly knitted SiC continuous fiber with an organic silicon compound and then calcining the thus impregnated SiC continuous fiber so as to densify the circularly knitted SiC continuous fiber.

The sleeve according to the present invention not only has a thin wall, but also is excellent in heat resistance, corrosion resistance, high strength, and precision in formability, even under a severe condition such as exposure thereof to radiation.

The sleeve according to the present invention exhibits an excellent performance or function as a shroud tube for a nuclear control rod for controlling a nuclear reactor, and also has an excellent compatibility with boron carbide as a neutron-absorbing material.

The sleeve according to the present invention can suitably be used not only as the shroud tube for the control rod for controlling a nuclear reactor, but also as a first wall (divertor) relating to nuclear fusion, a member to be exposed to a corrosive gas at a high temperature (e.g., a heat exchanger for petroleum cracking which is subjected to a high temperature of about 1,300° C.), etc., while the sleeve takes advantage of its heat resistance, strength, and precision in formability.

From the invention thus described, it will be obvious that the invention may be varied in many ways. Such variations are not to be regarded as a departure from the spirit and scope of the invention, and all such modifications as would be obvious to one skilled in the art are intended to be included in the scope of the following claims.

The basic Japanese Application No.280,927/1997 filed on Oct. 14, 1997 is hereby incorporated by reference.

What is claimed is:

1. A control rod for use in a nuclear reactor, said control rod comprising:

a cylindrical, thin-walled sleeve comprising an SiC fiber-reinforced SiC composite material which has a porosity of 40% or less and a wall thickness of 5 mm or less;

a neutron-absorbing material disposed within said sleeve; and a cylindrical cladding member disposed in overlying, surrounding relationship to said cylindrical, thin-walled sleeve.

2. A control rod according to claim 1, wherein said cylindrical, thin-walled sleeve comprises a circularly knitted SiC continuous fiber.

3. A control rod according to claim 1, wherein said cylindrical, thin-walled sleeve is produced by impregnating a circularly knitted SiC continuous fiber with an organic silicon compound and then calcining the thus impregnated SiC continuous fiber.

4. A control rod according to claim 1, wherein said cylindrical, thin-wall sleeve comprises three or less laminated layers of circularly knitted SiC continuous fiber.

* * * * *